Oct. 2, 1956  J. B. MAIN, JR  2,764,831
AIRPLANE SIGN
Filed Sept. 29, 1950
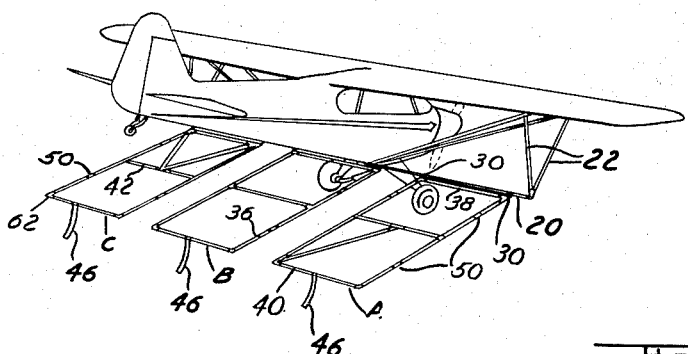
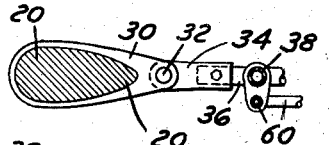
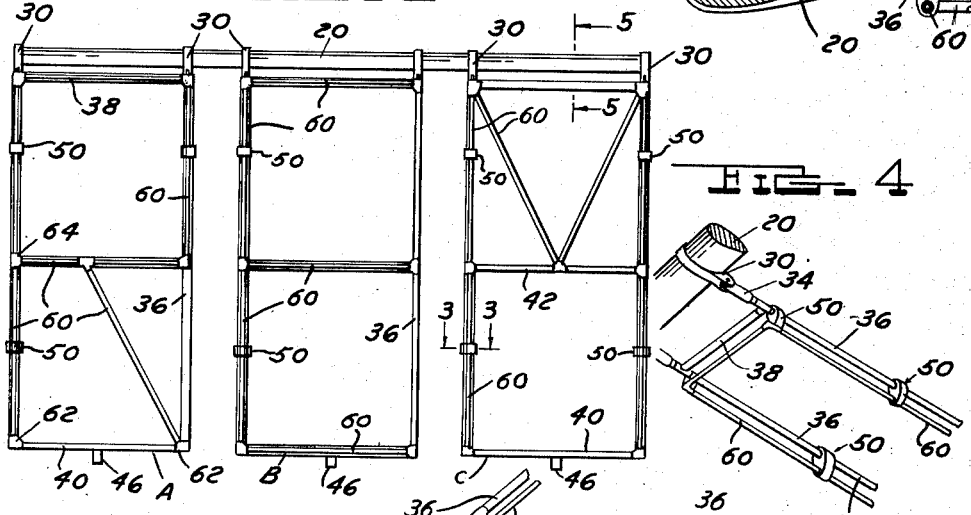
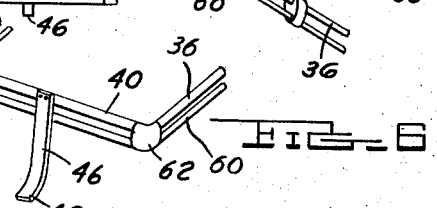
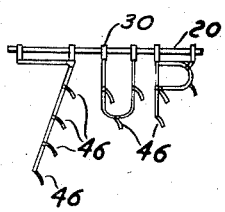
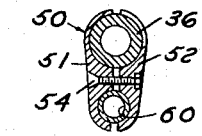
INVENTOR.
JOHN B. MAIN JR.
BY
Barnes, Kisselle, Laughlin & Raisch
ATTORNEYS

United States Patent Office 2,764,831
Patented Oct. 2, 1956

2,764,831

AIRPLANE SIGN

John B. Main, Jr., Birmingham, Mich.

Application September 29, 1950, Serial No. 187,509

3 Claims. (Cl. 40—127)

This application relates to an aircraft sign and has particularly to do with a sign which may be carried by an aircraft, particularly for night display.

The present invention relates to a sign-carrying structure which has a minimum of parts so that air resistance is reduced and which has a free floating sign structure pivoted at its forward edge so that the signs will float or plane in the air, reaching a position of equilibrium depending on the flight speed. Individual landing gear are provided for the signs so that a normal landing may be made without breakage and without independent manipulation of the signs.

Other objects and features of the invention relating to details of construction and operation will be apparent in the following description and claims.

Drawings accompany this application, and the various views thereof may be briefly described as:

Figure 1, a perspective view of a plane in flight illustrating the position of the signs.

Figure 2, a view of the signs looking up from a direction normal to the plane of the signs.

Figure 3, a sectional view on line 3—3 of Figure 2.

Figure 4, a perspective detail on the attachment of the sign to the draw bar.

Figure 5, a sectional view of the draw bar taken on line 5—5 of Figure 2.

Figure 6, a detailed view of a landing gear for the signs.

Figure 7, a view of an articulated sign.

Referring to Figure 1, a regular monoplane is shown of the Piper Cub type. This is an extremely light plane which is common around local airports and used by amateurs as well as professional flyers. Other types and sizes of planes may be used. A draw bar is located on this plane at 20 extending transversely of the fuselage below the wing and positioned relative to the length of the plane approximately at the center of gravity of the plane in flight position. The draw bar 20 is reinforced at its ends by two struts 22 extending from the end of the draw bar to the wing. The draw bar 20 preferably has a streamlined section as shown in Figure 5.

The particular signs to be supported on this draw bar are preferably of the type in which large letters are used: Any letter combinations can be used, and in some instances it is possible to fly two planes side by side or in other formations to obtain other word combinations.

The mounting means for the individual letter frames comprises first a special clamp shown at 30 which slips over and is attached to the streamlined draw bar 20. Pivoted to the clamp 30 at 32 and in trailing relation thereto is a socket member 34. These attaching members are pivoted in spaced relation along the draw bar. Sign frames to be carried by the draw bar are composed of longitudinally extending members 36, the forward ends of which will be received in a socket of the member 34 and clamped therein. The number of frames may vary with the particular requirements of the sign.

Cross members 38 and 40 serve to complete the rectangular frame. These frames may be formed of a light material such as aluminum or of bamboo. Additional cross members parallel to the end members 38 may be applied, depending on the particular sign to be supported and its design. For example, in letters having center lines, as shown in Figure 2, cross members 42 would be used to support the central portions of the letters.

The frame member 40 forming the trailing edge of the frame serves also as support for and a location of a landing gear for each particular frame. The particular landing gear which has been found to operate satisfactorily and to have low air resistance is a skid of flexible metal 46 having one end attached rigidly to the frame member 40 and the other end depending therefrom and curved back at 48 to serve as ground contact. Other known types of ground gear may, of course, be substituted.

An important feature of the present invention is the use of neon, incandescent, or fluorescent, lights to provide the illuminated portion of the sign, making it especially useful at night. The drawings show sections of neon tube which come in lengths of 18 inches, 24 inches, 30 inches, 36 inches, and so forth. It is possible to carry a 10-foot letter on a light Piper Cub plane by building up the letters from these sections of neon tube. Any letter can be formed on the frames which have been above described.

It is desirable that a wind-driven, high-frequency generator be used as a power source for the illumination and a double magneto may be used to provide the electrical current. Thus, the electrical system is primarily outside the plane as a safety factor. The neon signs are connected in a suitable electric circuit and associated with the frame member by a plurality of clamping devices 50, as shown particularly in Figure 3.

A double-member clamp having parts 51 and 52 connected by a bolt and nut combination 54 which is countersunk at each side serves to clamp the frame member 36 as well as the neon tube member 60. By applying these clamps 50 at suitable locating points around the frame, any combination of neon sign units can be held to the light frame.

In Figure 6 a special corner type of clamp 62 is shown wherein tubes meeting at right angles may be joined and clamped. In Figure 2 a T-shaped clamp is shown at 64 for the same purpose. A standard electrical connection between the various tubes that are arranged in endwise relation will suffice to complete the circuit through the tubes.

It will be seen that the various frames which can be indicated A, B, and C are suspended only at the forward edge, and they have a free pivotal action at the point 32. Large articulated letters may be used each with a landing gear attached to the rear or trailing edge of each section. In Figure 7, a schematic view is shown of a sign having several sections, each having a spring ground skid 46 at the trailing edge of the section.

In taking off, the skid 46 and each frame will drag along the ground until the plane reaches flying speed; after the plane becomes airborne, the frames will be elevated gradually and will assume a flying position substantially as shown in Figure 1 when the plane has picked up air speed.

The particular angle of the sign will depend on the air speed and the weight of the sign, but an equilibrium is immediately established as the plane takes to the air. Due to the fact that a plurality of frames are mounted independently, the plane is found to be more maneuverable in the air, in banking and in straight flight. This is important in landing in the event that one wing is lower than the other.

This sign allows for the most ideal distribution of widely varying weight and drag forces with respect to the aircraft's equilibrium. Since this sign is free-swinging about a balance point, variations in load as would occur in the change of different copy and variations that would necessarily occur in air speed would have little effect on the equilibrium of the aircraft. If the sign frames were rigidly fastened in any given position, any forces which in the sign tend to vary the angle of the frames, with respect to the longitudinal axis of the aircraft, would be transmitted directly to the aircraft, therefore very seriously affecting the aircraft's equilibrium.

In landing a plane, the first portions to touch the earth are the skids 46 which make contact and swing the signs upwardly in a position relatively parallel to the ground as the wheels of the plane touch. While in the air, the pilot has no control or manipulating handles with respect to the signs and his entire attention can be directed to flying the plane.

Thus, in take-off and in landing a gradual assumption of load is permitted. In take-off the plane can become airborne and increase its air speed before elevating to assume the sign load. Also, in take-off the signs are in a streamlined position to permit ground speed to be easily gained. In landing, the sign will strike first and the pilot will be able to judge his elevation accurately, especially in night flight. After landing it will be seen that the sign assembly can be easily disconnected to permit normal use of the plane.

What I claim is:

1. An electric sign for nighttime aerial advertising comprising, a draw bar adapted to be mounted on a winged airplane with its axis generally parallel to the wing of the airplane, a plurality of generally rigid frames constructed of lightweight material, a plurality of tube-type electric lights secured to said frames, pivotal mounting means for mounting one end of each frame on said draw bar with the other end of each frame swinging freely in a vertical direction, said mounting means being secured to spaced apart portions of said one end of each frame and said draw bar whereby to limit the movement of said frames to such vertical swinging movement, said frames being mounted on said draw bar independently of each other, whereby to adjust independently to the air stream while in flight and ground engaging means on each frame for protecting said frames while the airplane is landing and taking off.

2. In combination, a winged airplane and an electric sign of the type defined in claim 1.

3. An airborne electric light sign to be lighted by neon tubes or the like for nighttime advertising comprising, a winged airplane, means forming a draw bar on the airplane with its axis extending generally parallel to the wing of said airplane, a plurality of light-weight frames mounted to swing only on an axis parallel to that of the draw bar and mounted to swing independently of each other, whereby to plane at independent angles during flight, said frames being composed of slender rods of light material, such as aluminum or bamboo, a plurality of light tubes of the neon type, means to clamp said tubes in connected relation on said frame rods to provide an advertising display, and means on each frame for engaging the ground while said airplane is landing and taking off.

References Cited in the file of this patent

UNITED STATES PATENTS

| | | |
|---|---|---|
| 1,727,095 | Bleriot | Sept. 3, 1929 |
| 1,729,354 | Mounce | Sept. 24, 1929 |
| 1,773,549 | Rohlfs | Aug. 19, 1930 |
| 1,903,131 | Picco | Mar. 28, 1933 |
| 1,982,960 | Link, Jr. | Dec. 4, 1934 |
| 1,999,479 | Reder | Apr. 30, 1935 |
| 2,001,200 | Knapp | May 14, 1935 |
| 2,094,890 | Hoyt | Oct. 5, 1937 |
| 2,203,623 | Wiemer | June 4, 1940 |
| 2,617,220 | McCarty, Jr., et al. | Nov. 11, 1952 |